United States Patent [19]

Venable

[11] Patent Number: 4,516,787

[45] Date of Patent: May 14, 1985

[54] LIGHTGUIDE PREFORM CHUCK

[75] Inventor: Edward R. Venable, Gwinnett County, Ga.

[73] Assignee: AT&T Technologies, Inc., Berkeley Heights, N.J.

[21] Appl. No.: 440,774

[22] Filed: Nov. 10, 1982

[51] Int. Cl.³ .............................................. B23B 31/16
[52] U.S. Cl. .................................. 279/1 SG; 279/2 R; 279/23 R; 279/46 R; 65/374.12; 269/287
[58] Field of Search ................ 279/1 R, 1 ME, 1 SG, 279/2, 20, 23 R, 41 R, 46 R, 46 A, 47, 48, 49, 50, 51, 52, 53; 65/374.1, 374.12; 269/287

[56] References Cited

U.S. PATENT DOCUMENTS 4,347,069  8/1982  Haney et al. ....................... 65/3.2
4,389,231  6/1983  Partus ................................. 65/3.2

Primary Examiner—Gil Weidenfeld
Assistant Examiner—Daniel W. Howell
Attorney, Agent, or Firm—Don P. Bush

[57] ABSTRACT

A lightguide preform chuck (15) comprises a collet (32) having a slotted conical end (36) and collet restraining means (40/42/45) in engagement with the collet ends but spaced from a collet mid-portion. The restraining means has a coefficient of thermal expansion less than that of the collet whereby under elevated temperature conditions the collet arches into gripping engagement with a lightguide preform held therein.

9 Claims, 4 Drawing Figures

LIGHTGUIDE PREFORM CHUCK

TECHNICAL FIELD

This invention relates generally to apparatuses for holding cylindrical objects of a type having a low coefficient of thermal expansion during elevated temperature conditions, and particularly to chucks for holding lightguide preform tubes as they are being manufactured into preforms by chemical vapor deposition.

BACKGROUND OF THE INVENTION

In constructing preforms from which optical fibers may be drawn that are suitable for use as telecommunication lightguides, vapors of materials such as $SiCl_4$, $GeCl_4$, $BCl_3$ and $POCl_3$ are entrained in an oxydizing carrier gas such as oxygen. The vapor stream is then drawn into a rotating preform tube made of, for example, quartz that is being repeatedly traversed by a torch. As the vapor stream encounters the band of heat generated by the torch, oxide particles are formed which deposit on and fuse to the interior wall of the tube. After a selected number of oxide layers have been built up upon the tube, the tube is collapsed into a solid rod, by raising the temperature of the torch, from which rod fiber may be drawn. This is generally known as the modified chemical vapor deposition or MCVD process.

In conducting the MCVD process the preform tube is mounted to a lathe with each tube end held in a rotatable chuck. In order to inhibit the vapor stream from leaking to ambience and ambient air from entering and thereby contaminating the vapor stream with water vapor, a rotary seal is employed at the juncture of stationery and rotary tube elements of the lathe through which the vapor stream is introduced into the preform tube. In addition, oxygen, a component of the vapor stream itself, is often flowed under pressure over an end portion of the preform tube near the tube inlet as an added precaution to inhibit ambient air from entering the tube.

A problem associated with the just-described apparatus has been that of heat shrinkage of the preform tube during tube collapse. As the tube is collapsed radially it also tends to shrink axially due to surface tension. The lathe chucks, which typically have had three circumferentially-spaced jaws that are brought down against a heat-resistance shroud wrapped over end portions of the tube, have often not provided sufficient gripping force to prevent such axial shrinkage. As a result, preform tubes have often contracted and become out of alignment leading to uneven heating and out-of-roundness. Once a preform has taken on a significant degree of ovality it must be scrapped as unsuitable for draw into communications-grade fiber.

There are, of course, other devices available for gripping cylindrical objects in general such as pipe fittings, collets and the like. However, since the gripping device or chuck must ordinarily be metallic in order to provide resilience, spring retention and lack of brittleness, it will have a coefficient of thermal expansion greater than that of glass. As a result, the object used for directly gripping the quartz tube will expand and move radially away from the preform tube as it and the tube are heated. Non-metallic devices, such as rubber O-rings would not be usable since the temperatures achieved would well exceed their melting point. Nor would Teflon rings or ferrules be satisfactory due to their tendency to cold flow, i.e. move and assume a new, fixed shape. Other non-metallic materials would tend to outgas. Accordingly, a need remains for a chuck suitable for holding cylindrical objects such as optical fiber preform tubes having low coefficients of thermal expansion during periods of elevated temperature. It is the satisfaction of such need to which the present invention relates.

SUMMARY OF THE INVENTION

In one form of the invention apparatus for holding a cylindrical glassy object under elevated temperature conditions comprises a collet of a size such as to be placed closely about the object and formed of a material having a selected coefficient of thermal expansion. The apparatus further comprises collet restraining means in abutment with the end-portions of the collet but spaced from a mid-portion of the collet. The restraining means is formed of a material having a coefficient of thermal expansion less than the selected coefficient of thermal expansion whereby during conditions of elevated temperatures axial expansion of the collet is restrained by the collet-restraining means causing the collet mid-portion to arch outwardly from the object and causing a collet end to arch inwardly into gripping engagement with the object.

In another form of the invention a chuck for holding a cylindrical object having a lower coefficient of thermal expansion than that of the apparatus components comprises a collet of a selected coefficient of thermal expansion having a plurality of annularly disposed fingers with canted surfaces that collectively form a slotted, truncated-conical surface of one collet end. The chuck also comprises collet restraining means having a coefficient of thermal expansion less than the selected coefficient of thermal expansion that is in engagement with the one collet end and with the collet end opposite the one collet end but spaced from a mid-portion of the collet located between the two collet ends.

In yet another form of the invention a lightguide preform chuck comprises first and second tubular members coupled together about opposite ends of a collet so as to form an annular cavity about a mid-portion of the collet. At least one of the tubular members has a truncated-conical interior wall mounted flush against a slotted, truncated-conical surface of one collet end. The collet has a coefficient of thermal expansion greater than that of the tubular members whereby during conditions of elevated temperature the collet mid-portion may arch outwardly into the cavity and the collet slotted one end may arch inwardly into gripping engagement with a lightguide preform positioned therewithin.

BRIEF DESCRIPTION OF THE DRAWING

FIG. 3 is an enlarged side elevational view, shown partly in cross-section, of the chuck illustrated in FIG. 2 shown in a configuration at unelevated temperature while

DETAILED DESCRIPTION

Figure 1:
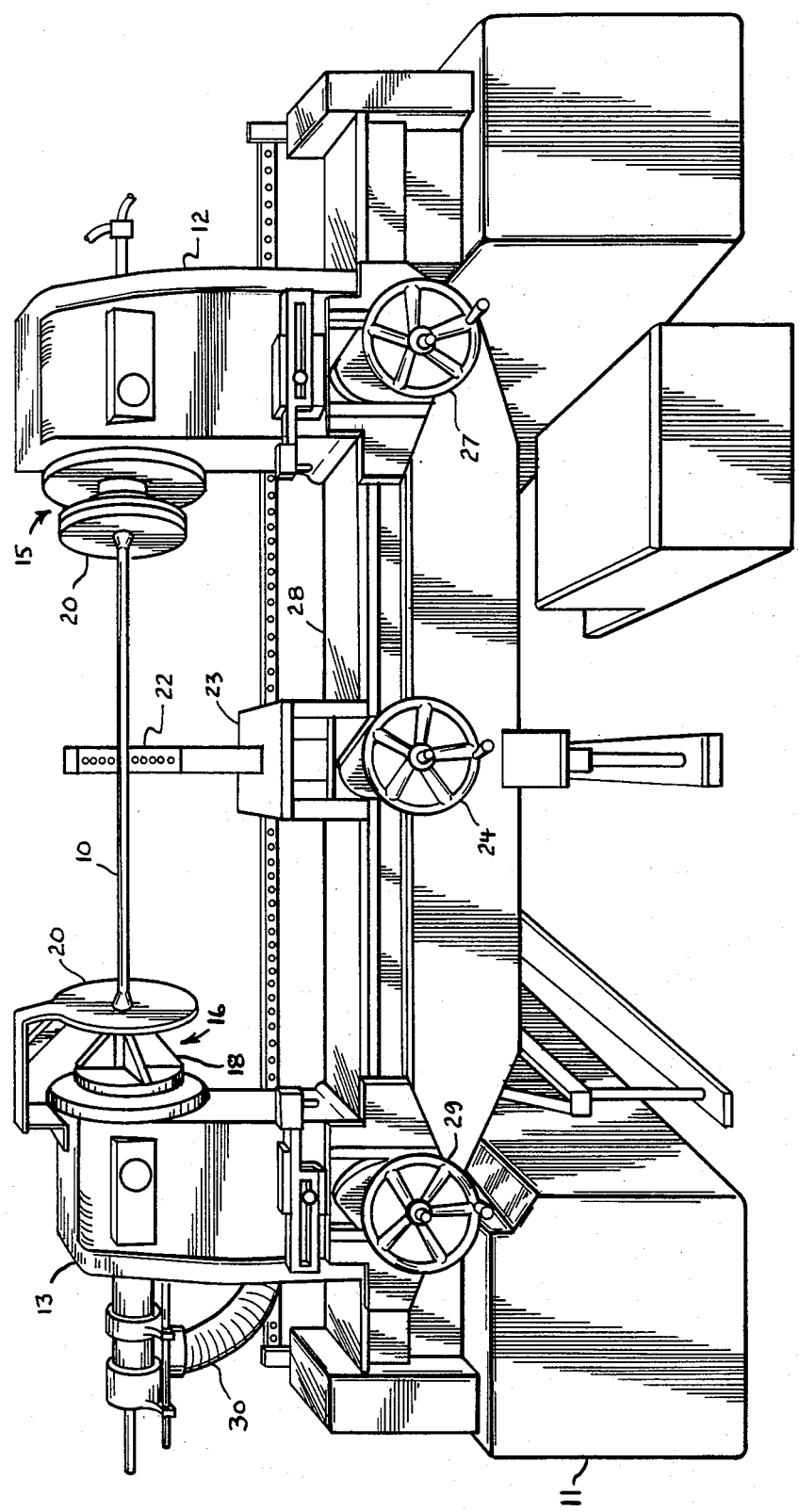
FIG. 1 is a perspective view of a lathe to which a light-guide preform tube is rotatably mounted for chemical vapor deposition.

Referring now in more detail to the drawing, there is shown in FIG. 1 a lathe for forming an optical fiber preform by the MCVD process during which chemical reaction products are formed and deposited on the interior surface of a quartz preform tube 10 that has for example, a coefficient of thermal expansion of $0.75 \times 10^{-6}$ cm/cm/°C. The lathe includes a frame 11 atop which a headstock 12 and a tailstock 13 are mounted. The headstock 12 and its internal mechanisms rotatably support and drive a chuck 15 while the tailstock 13 and its internal mechanisms similarly rotatably support and drive another chuck 16 about a common axis with that of chuck 15. The chuck 16 is of conventional construction being comprised of a set of angularly-spaced jaws 18 that are adapted to be moved into and out of gripping engagement with the preform tube or with a heat-resistant shroud wrapped thereabout. The chuck 15 however is of novel construction as is described hereinafter in detail. Centrally apertured heat shields 20 are mounted to both stocks closely adjacent the rotatable chucks. A hydrogen-oxygen torch 22 is mounted atop a carriage 23 for reciprocal movement between the two heat shields. The torch is reciprocated by an unshown, automated drive mechanism which can be manually overridden for torch positioning by means of a hand-wheel 24. Similarly, the lateral position of the headstock 12 may be adjusted by a handwheel 27 atop a rail 28 while the position of the tailstock may be manually adjusted over the same rail by movement of a handwheel 29.

During chemical vapor deposition the preform tube 10 is rotated by chucks 15 and 16. A vapor stream is drawn into the tube by an upshown vapor stream generator. As the vapor stream is passed through the preform tube, moving from the headstock 12 towards the tailstock 13, the torch 22 is slowly moved along the rotating tube thereby causing a chemical reaction to occur within the band of heat created by the torch evenly throughout the tube. Products of this reaction then deposit on and fuse to the interior surface of the tube. Any undeposited reaction products are exhausted out of the preform tube 10 through an exhausted tube 30. Some of the heat so generated is, of course, conducted along the tube 10 to the tube-holding chucks at each of its ends.

Figure 2:
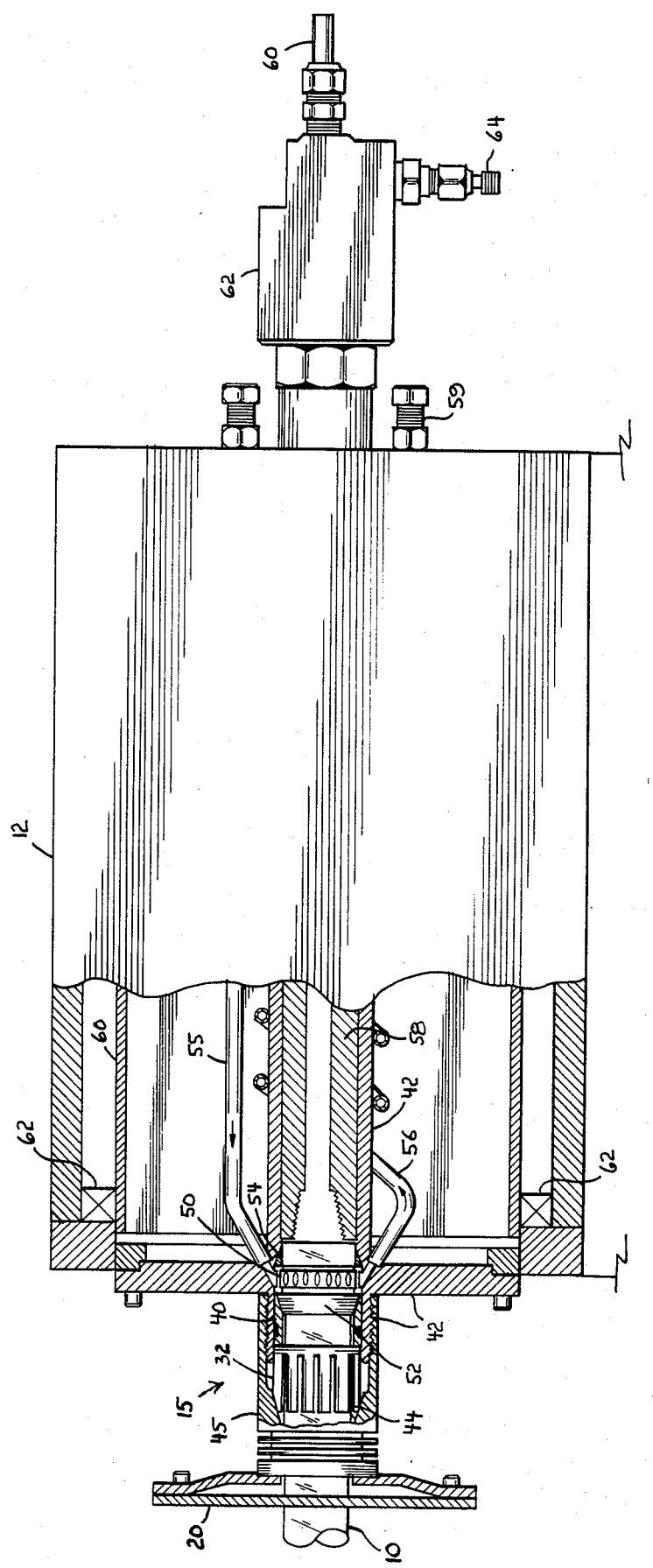
FIG. 2 is a side-elevational view, partly shown in cross-section, of a lightguide preform chuck component of the lathe shown in FIG. 1 which embodies principles of the present invention.
Figure 3:
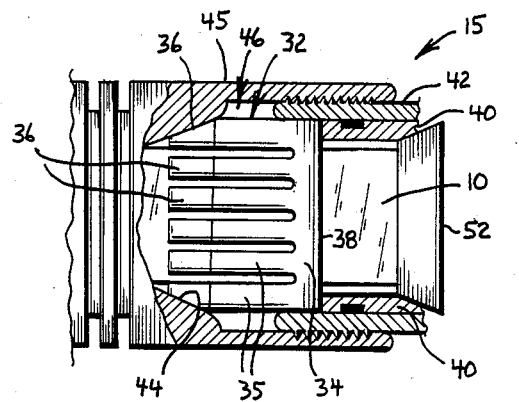
Figure 4:
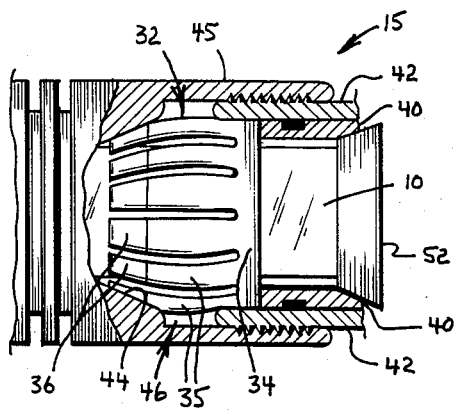
FIG. 4 illustrates the chuck expanded at elevated temperature conditions.

With reference next to FIG. 2, the chuck 15 is seen to comprise a collet 32 which, as shown more clearly in FIGS. 3 and 4, has a ring portion 34 from which an annular set of fingers 35 unitarily extend. The collet here is formed of a copper-beryllium alloy which has a coefficient of thermal expansion of $17 \times 10^{-6}$ cm/cm/°C. and a hardness of 35 to 40 RC. An end-portion of each finger distal the ring portion 34 is beveled or canted as shown at 36 whereby the fingers collectively define a multi-slotted, truncated-conical surface. The opposite end of the collet has an annular, planar rim or edge 38 which is in abutment with the end of a stub ring 40 that is seated within a threaded end of a steel arbor 42. The truncated-conical surface 36 of the collet finger set is mounted flush against a truncated-conical interior surface 44 of a steel nut 45 that is threaded onto the arbor 42. Once threaded, an annular space or gap 46 exists about a mid-portion of the collet which space is defined by the collet, the end of the arbor 42 and the nut 45. The nut, stub ring and arbor are each formed of, for example No. 316 stainless steel which has a coefficient of thermal expansion on the order of $11 \times 10^{-6}$ cm/cm/°C.

A purge ring 50 is seen to be positioned within the arbor about the preform tube to each side of which Teflon ferrules 52 and 54 are mounted. An inlet tube 55 communicates with the purge ring as does an outlet tube 56. The outlet tube 56 is wrapped helically about the arbor while a Teflon tube 58 is mounted within the arbor. The arbor 42, tubes 55 and 56, and collet 15 are all mounted for rotation, along with an arbor shell 60 within the headstock 12 by means of bearings 62, shown schematically, and rotary drive and drive transmission means, not shown.

During the vapor deposition process the vapor stream is introduced through a conduit 60 and through an unshown rotary seal housed within seal housing 62. The stream then passes through the tube 58 housed within the arbor and into the preform tube 10. At the same time oxygen is introduced through conduit 64 into the inlet tube 55 to the purge ring 50 where it is channeled completely around the preform tube. This serves to prevent an escape of the vapor stream itself to ambient atmosphere and further prevents the introduction of air and water vapor from ambience into the preform tube. From the purge ring the stream of oxygen passes through outlet tube 56 about the arbor to effect a cooling action, and then out of the headstock through outlet 59.

With reference next to FIG. 3, it is seen that prior to the preform tube 10 being subjected to the heating action from torch 22, collet 32 is positioned closely about the preform tube with its planar rim 38 in abutment with an end of stub ring 40, and with its conically beveled end surface 36 flush against the conically beveled surface 44 of nut 45. The stub ring is held firmly in place by ferrule 52 of the double ferrule purge ring assembly. Once the vapor deposition process starts, the preform tube heats up very substantially due to the fact that the torch produces a temperature as high at 1800° C. during deposition within its band of heat imposed upon the preform tube. After the deposition phase of the process is completed the temperature of the tube is increased still further to cause the tube to collapse into a solid rod shape. As this occurs the tube tends also to shrink axially leading to the earlier-mentioned problem. Such axial shrinkage however is now inhibited by the just-described chuck. Preferably, the chucks at both ends of the preform tube have the structure of chuck 15, the chuck 16 having been shown to illustrate the prior art.

As depicted in FIG. 4, it is seen that as the temperature of the preform rises the temperature of the collet, the stub ring, the arbor and nut also rise due to conduction of heat from the preform tube. Since the coefficient of thermal expansion of the collet is greater than that of the stub ring, arbor and nut, the collet tends to expand axially more than that of these other chuck components in abutment therewith. As a result, the nut and stub ring force the collet to buckle or arch outwardly into the cavity 46 as shown in FIG. 4. As this arching occurs the beveled or canted ends of the fingers distal the ring portion 34 are forced downwardly against the conical surface of the nut and into gripping engagement with the preform tube. This action has been found to provide sufficient gripping force to the preform tube to prevent it from shrinking significantly.

It thus is seen that a lightguide preform chuck is provided of unique construction and operation that effectively grips cylindrical glass objects in a manner to prevent axial movement under conditions of elevated temperature. Though the collet may be used for holding various cylindrical objects, it is particular well-suited for use in the manufacture of lightguide preform tubes. It thus should be understood that the just-described embodiment merely illustrates principles of the invention in one preferred form. Many modifications, additions and deletions may, of course, be made thereto without departure from the spirit and scope of the invention as set forth in the following claims.

What is claimed is:

1. Apparatus for holding an object under elevated temperature conditions comprising a collet made of a material and so constructed to permit lateral deflection of intermediate portions and end portions thereof and being of a size and structure such as to have portions thereof adapted to be placed adjacent to the object and in clamping engagement therewith, said collet also being formed of a material having a selected coefficient of thermal expansion, and collet restraining means being formed of a material having a coefficient of thermal expansion less than said selected coefficient of thermal expansion, said collet restraining means being in engagement with each end portion of said collet to restrain normal longitudinal movement of said collet during relative thermal expansion of said collet with respect to said collet restraining means while permitting and causing lateral deflection of end and intermediate portions thereof to maintain clamping engagement of the end portions with the object, said collet restraining means being spaced from an intermediate portion of said collet to permit lateral deflection of the intermediate portions of said collet so that during conditions of elevated temperatures stresses set up in the material of the collet caused by the restraint of the normal longitudinal thermal expansion of the collet are translated into lateral deflection of the end portions of the collet to maintain the end portions of the collet in clamping engagement with the object and lateral deflection of intermediate portions of the collet to maintain kinetic clamping force on the object caused by the resiliency of the laterally deflected intermediate portions of the collet.

2. The apparatus for holding an object of claim 1 wherein said collet has a ring portion from which an annular disposed set of fingers unitarily extends with the end of said set of fingers distal said ring portion being frustoconically shaped, and wherein said collet restraining means has a frustoconical surface in camming engagement with said frustoconically shaped ends of said set of fingers which are adapted to cooperate therewith and cause lateral deflection of the free ends of the fingers during relative thermal expansion of said collet to maintain clamping forces between the free ends of the fingers and the object.

3. The apparatus for holding an object of claim 2 wherein the ring portion of said collet ring portion has a substantially circular rim which forms the other end of the collet, and wherein said collet restraining means has a planar, annular surface in abutting engagement with the rim of said collet ring portion.

4. A chuck for holding a cylindrical object having a lower coefficient of thermal expansion than that of the chuck, and with the chuck comprising a collet made of a material having a selected coefficient of thermal expansion and having a plurality of annularly disposed fingers extending longitudinally of said collet, the fingers of said collet having canted camming surfaces that collectively form a slotted, truncated-conical surface on one end of said collet; and collet restraining means having a coefficient of thermal expansion less than said selected coefficient of thermal expansion, said collet restraining means in engagement with the ends of said collet but spaced from an intermediate portion of said collet located between opposite ends of said collet, said collet restraining means adapted to restrain normal longitudinal expansion of said collet and permitting lateral deflection of said fingers and intermediate portions of said collet, the collet restraining means having a frustoconical camming surface in mating camming engagement with the truncated-conical surface of the collet and cooperating therewith so that longitudinal movement of the camming surfaces on ends of the fingers of said collet relative to the camming surface of the collet restraining means is translated into lateral deflection of said fingers to maintain clamping engagement of the fingers of said collet with said object while forces set up in the material of said collet as a result of the restrain of the normal longitudinal expansion of the collet are translated into stresses causing lateral deflection of intermediate portions of said collet to maintain a kinetic clamping force on the object by the fingers caused by the resiliency of the laterally deflected intermediate portions of the collet.

5. A chuck for clamping objects comprising a collet adapted to engage an object, a collet restraining means for restraining normal longitudinal expansion of said collet, said collet restraining means including first and second tubular members coupled rigidly together about opposite ends of said collet and cooperating therewith to form an annular cavity about an intermediate portion of said collet to permit an intermediate portion of the collet to deflect laterally into the cavity, and with at least one of said tubular members having a truncated-conical interior wall portion, said collet having a slotted truncated-conical external surface on one end thereof mounted in flush engagement with the internal surface of the truncated-conical wall of the collet restraining means and with said collet having a coefficient of thermal expansion greater than that of said tubular members of the collet restraining means so that stresses set up in the collet as a result of the restrain of the normal longitudinal expansion of the collet during conditions of elevated temperatures will cause the intermediate portion of said collet to deflect outwardly into the cavity and will cause the one end of the collet to deflect inwardly to maintain gripping engagement with an object positioned therewithin as a result of the difference in the relative thermal expansion of the collet with respect to the restraining means.

6. A chuck for clamping objects in accordance with claim 5 wherein the one slotted end of said collet comprises a set of annularly disposed fingers in clamping engagement with the object.

7. A chuck for clamping an object comprising a collet restraining means including a first tubular member having a threaded end portion into which a lightguide preform is adapted to be positioned, a stub ring fixedly seated within the threaded end portions of said tubular member and a second tubular member threaded onto the threaded end portion of said first tubular member and having a conical interior surface located adjacent to the said threaded end portion of said first tubular member, said collet restraining means being formed of a material having a selected coefficient of thermal expansion, and a collet formed of a material having a coefficient of thermal expansion greater than said selected coefficient of thermal expansion, said collet having a truncated conical outer surface in mating camming engagement with the conical interior surface of the second tubular member of the collet restraining means, said collet being positioned between said second tubular member conical surface and said stub ring and being so constructed and arranged in cooperative relationship therewith that when the temperature of the chuck is elevated in operation the relative expansion of the collet with respect to the collet restraining means causes the mating conical surfaces to be moved with respect to each other to cause a camming action of the adjacent portions of the collet to maintain them in clamping engagement with an object held in the chuck.

8. A chuck for clamping an object in accordance with claim 7 wherein said collet has a set of annularly disposed fingers, ends of which form the conical surface in abutment with the conical surface of said second tubular member and with the object being clamped.

9. Apparatus for holding an object under elevated temperature conditions comprising a collet of a size and structure such as to have end portions thereof adapted to be placed in clamping engagement with the object, said collet being formed of a material having a selected coefficient of thermal expansion, and collet restraining means in abutting engagement with one end-portion of said collet and camming engagement with the other end portion of said collet and being formed of a material having a coefficient of thermal expansion less than said selected coefficient of thermal expansion, so that during conditions of elevated temperatures normal relative longitudinal expansion of the collet with respect to the collet restraining means is restrained by said collet restraining means but the longitudinal movement of one of the end portions of said collet in camming engagement with the collet restraining means causes the longitudinally expanding of the end portions in camming engagement with the collet restraining means to deflect laterally to maintain gripping engagement with the object.

* * * * *